US007055206B2

(12) United States Patent
Boland

(10) Patent No.: US 7,055,206 B2
(45) Date of Patent: Jun. 6, 2006

(54) WINDSCREEN WIPER DEVICE

(75) Inventor: Xavier Boland, Arlon (BE)

(73) Assignee: Federal Mogul S.A., Aubange (BE)

(*) Notice: Subject to any disclaimer, the term of this patent is extended or adjusted under 35 U.S.C. 154(b) by 0 days.

(21) Appl. No.: 10/495,497

(22) PCT Filed: Nov. 14, 2002

(86) PCT No.: PCT/EP02/12977

§ 371 (c)(1),
(2), (4) Date: Oct. 7, 2004

(87) PCT Pub. No.: WO03/042017

PCT Pub. Date: May 22, 2003

(65) Prior Publication Data
US 2005/0039292 A1 Feb. 24, 2005

(30) Foreign Application Priority Data
Nov. 16, 2001 (EP) ................... 01000640

(51) Int. Cl.
B60S 1/40 (2006.01)
(52) U.S. Cl. .................. 15/250.32; 15/250.351; 15/250.43; 29/428
(58) Field of Classification Search ............ 15/250.32, 15/250.43, 250.44, 250.201, 250.351; 29/428
See application file for complete search history.

(56) References Cited

U.S. PATENT DOCUMENTS

| 2,404,523 | A | * | 7/1946 | Nesson | 15/250.32 |
| 2,798,244 | A | | 7/1957 | Nesson | |
| 3,576,044 | A | * | 4/1971 | Besnard | 15/250.32 |
| 3,659,309 | A | * | 5/1972 | Besnard | 15/250.32 |
| 4,348,782 | A | * | 9/1982 | Fournier | 15/250.32 |
| 5,970,569 | A | * | 10/1999 | Merkel et al. | 15/250.43 |
| 6,226,829 | B1 | * | 5/2001 | Kotlarski | 15/250.32 |
| 6,295,690 | B1 | * | 10/2001 | Merkel et al. | 15/250.201 |
| 6,499,181 | B1 | * | 12/2002 | Kotlarski | 15/250.201 |

FOREIGN PATENT DOCUMENTS

| DE | 199 07 629 A1 | 8/2000 |
| DE | 100 04 529 A1 | 8/2001 |
| FR | 2 222 855 | 10/1974 |
| FR | 2 804 923 | 8/2001 |

* cited by examiner

Primary Examiner—Gary K. Graham
(74) Attorney, Agent, or Firm—Dickinson Wright PLLC

(57) ABSTRACT

A windscreen wiper device comprising an elastic, elongated carrier element, as well as an elongated wiper blade of a flexible material, which windscreen wiper device comprises a connecting device for an oscillation wiper arm, wherein the oscillating arm is pivotally connected to the connecting device about a pivot axis near one end. The end of the oscillating wiper arm has an at least substantially U-shaped cross-section and the connecting device is at least partly positioned within the end of the oscillating arm. The end of the oscillating arm is provided, at the location of the pivot axis, with a shaft extending between the legs of the U-shaped cross-section. The shaft is pivotally engaged in the connecting device.

19 Claims, 3 Drawing Sheets

WINDSCREEN WIPER DEVICE

BACKGROUND OF THE INVENTION

1. Technical Field

The invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating wiper arm, wherein said oscillating arm is pivotally connected to said connecting device about a pivot axis near one end.

2. Related Art

Such a windscreen wiper device is generally known. The prior art windscreen wiper device is in particular designed as a "yokeless" wiper device, wherein use is no longer made of several yokes pivotally connected to each other, but wherein the wiper blade is biassed by the carrier element, as a result of which it exhibits a specific curvature. The oscillating arm of the prior art windscreen wiper device comprises a projecting pin on one side thereof, which is inserted sideways into a through hole of the connecting device.

One drawback of the prior art windscreen wiper device is the fact that in practice the forces (torques) that are exerted on the connection between the connecting device and the oscillating arm appear to be relatively high, as a result of which the reliability of said connection appears to diminish with the passage of time. In addition, said forces (torques) will be extra high if (as is the case with the prior art windscreen wiper device) the pin of the oscillating arm, which projects in one direction, is inserted into the through hole of the connecting device at a high point relative to the wiper blade.

The object of the invention is to overcome the drawbacks of the prior art as indicated above, in particular to provide a windscreen wiper device wherein the oscillating wiper and the connecting device are interconnected in a durable, solid manner.

In order to accomplish that objective, a windscreen wiper device of the kind referred to in the introduction is characterized in that the end of the oscillating wiper arm has an at least substantially U-shaped cross-section and that the connecting device is at least partly positioned within said end or the oscillating arm, wherein the end of the oscillating arm is provided, at the location of the pivot axis, with a shaft extending between the legs of the U-shaped cross-section, said shaft pivotally engaging in said connecting device. In particular, the shaft can be pivotally fitted in at least one correspondingly shaped recess in the connecting device.

In one preferred embodiment of a windscreen wiper device according to the invention, the shaft can be snapped into said recess.

In another preferred embodiment of a windscreen wiper device according to the invention, the shaft is dimensioned such that it can be passed through an insertion opening of the recess from an at least substantially perpendicular position of the oscillating arm with respect to the wiper blade, and be locked in position in said recess from an at least substantially parallel position of the oscillating wiper arm with respect to the wiper blade. This makes it possible to move, in particular pivot, the oscillating wiper arm from a mounting position (that is, a (vertical) position perpendicularly to the wiper blade or the plane of a windscreen to be wiped) to an operative position (that is, a (horizontal) position parallel to the wiper blade or the plane of a windscreen to be wiped). In the mounting position, the shaft can be freely inserted into the insertion opening of the recess and subsequently be mounted in said recess, whilst in the operative position the shaft is locked in position in said recess, so that it cannot move out of said recess via the insertion opening.

In another preferred embodiment of a windscreen wiper according to the invention, the shaft is formed by two protrusions each extending inwardly on a leg of the U-shaped cross-section. Preferably said protrusions are at least substantially cylindrical and form at least substantially cylindrical bearing surfaces. The two protrusions that function as bearing surfaces are spaced far apart, so that the forces that are exerted on said bearing surfaces will be relatively low.

In another preferred embodiment of a windscreen wiper according to the invention, the connecting device device includes a guide groove for the oscillating wiper arm. Since the oscillating wiper arm is at least partially disposed in said guide groove in the aforesaid operative position, the oscillating wiper arm comprises additional capability of withstanding relatively high torques in that position.

In another preferred embodiment of a windscreen wiper according to the invention the shaft is formed by a pin extending from one leg to the other leg of the U-shaped cross-section.

In another preferred embodiment of a windscreen wiper device according to the invention, said connecting pieces are clamping members, which form separate constructional elements. In particular, said connecting pieces are form-locked ("positive locking" or "having positive fit") or force-locked to the adjacent ends of the longitudinal strips.

In another preferred embodiment of a windscreen wiper device according to the invention, said connecting pieces are in one piece with said longitudinal strips.

In another preferred embodiment of a windscreen wider device according to the invention, at least said longitudinal strips are made of spring band material, preferably steel.

In another preferred embodiment of a windscreen wiper device according to the invention, said connecting device comprises clamping members, which engage round longitudinal sides of said longitudinal strips that face away from each other. In particular, said connecting device and said clamping members are made in one piece.

The invention furthermore relates to a method for manufacturing a windscreen wiper device according to the invention, wherein opposing longitudinal grooves are formed in the longitudinal sides of an elongated wiper blade of a flexible material, which can be placed in abutment with a windscreen to be wiped, in which grooves longitudinal strips of a carrier element are subsequently fitted in spaced-apart relationship, wherein neighbouring ends of said longitudinal strips are interconnected by a respective connecting piece, wherein an oscillating arm is pivotally connected to a connecting device of the windscreen wiper device about a pivot axis near one end thereof, characterized in that the end of the oscillating wiper arm has an at least substantially U-shaped cross-section and that the connecting device is at least partly positioned within said end of the oscillating arm, wherein the end of the oscillating arm is provided, at the location of the pivot axis, with a shaft extending between the legs of the U-shaped cross-section, said shaft pivotally engaging in said connecting device.

THE DRAWINGS

The invention will now be explained in more detail with reference to figures illustrated in a drawing, wherein.

Figure 2:
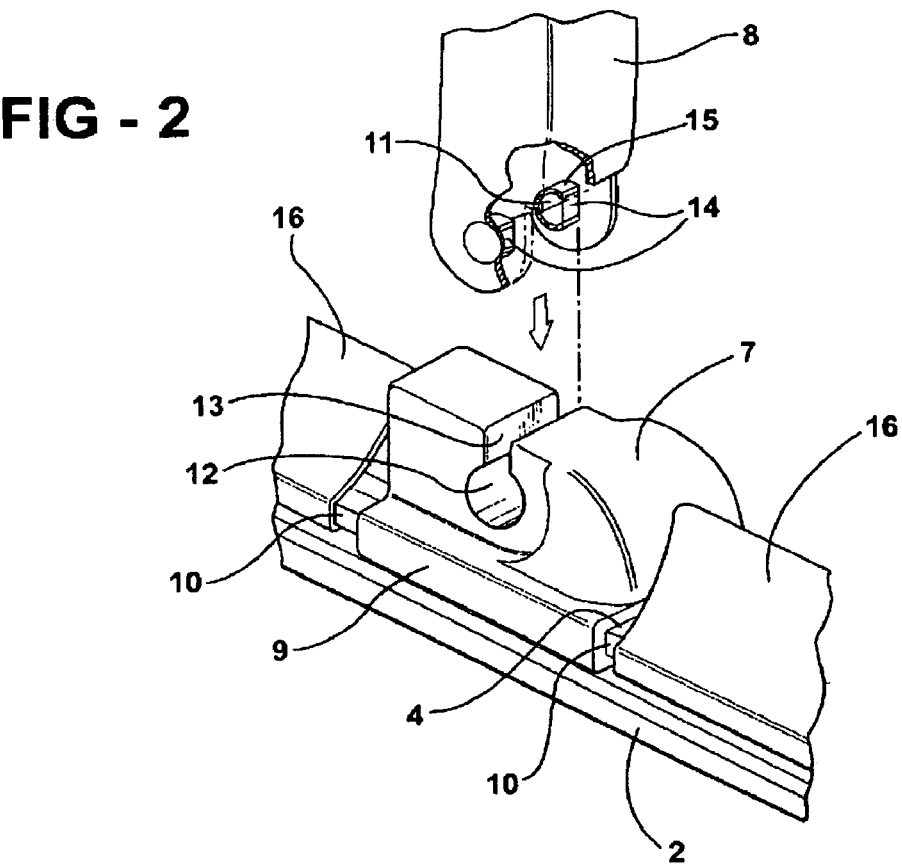
FIGS. 2 and 3 show details of the windscreen wiper device of FIG. 1, wherein various successive steps for fitting an oscillating wiper arm to a connecting device of the windscreen wiper device of FIG. 1.
Figure 4:
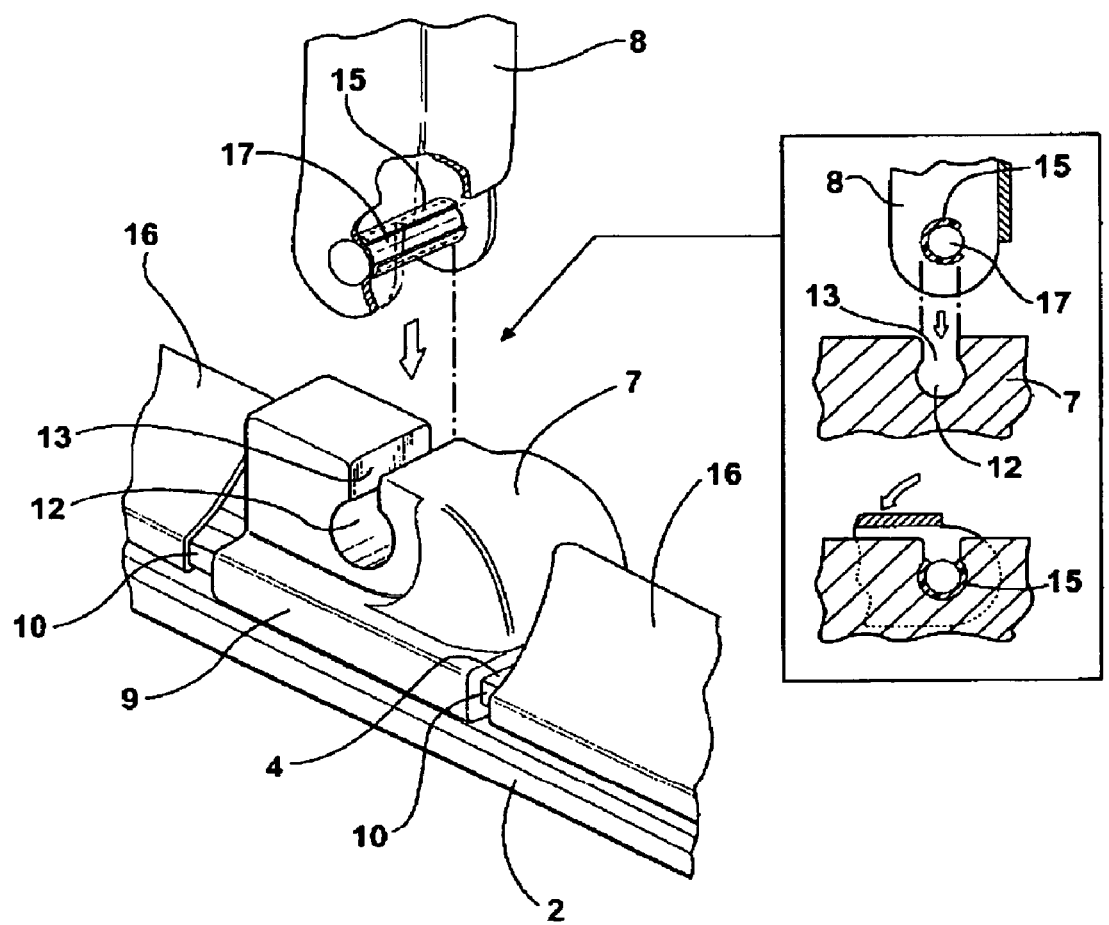

FIG. 4 corresponds to FIG. 2, but relating to another embodiment.

DETAILED DESCRIPTION

Figure 1:
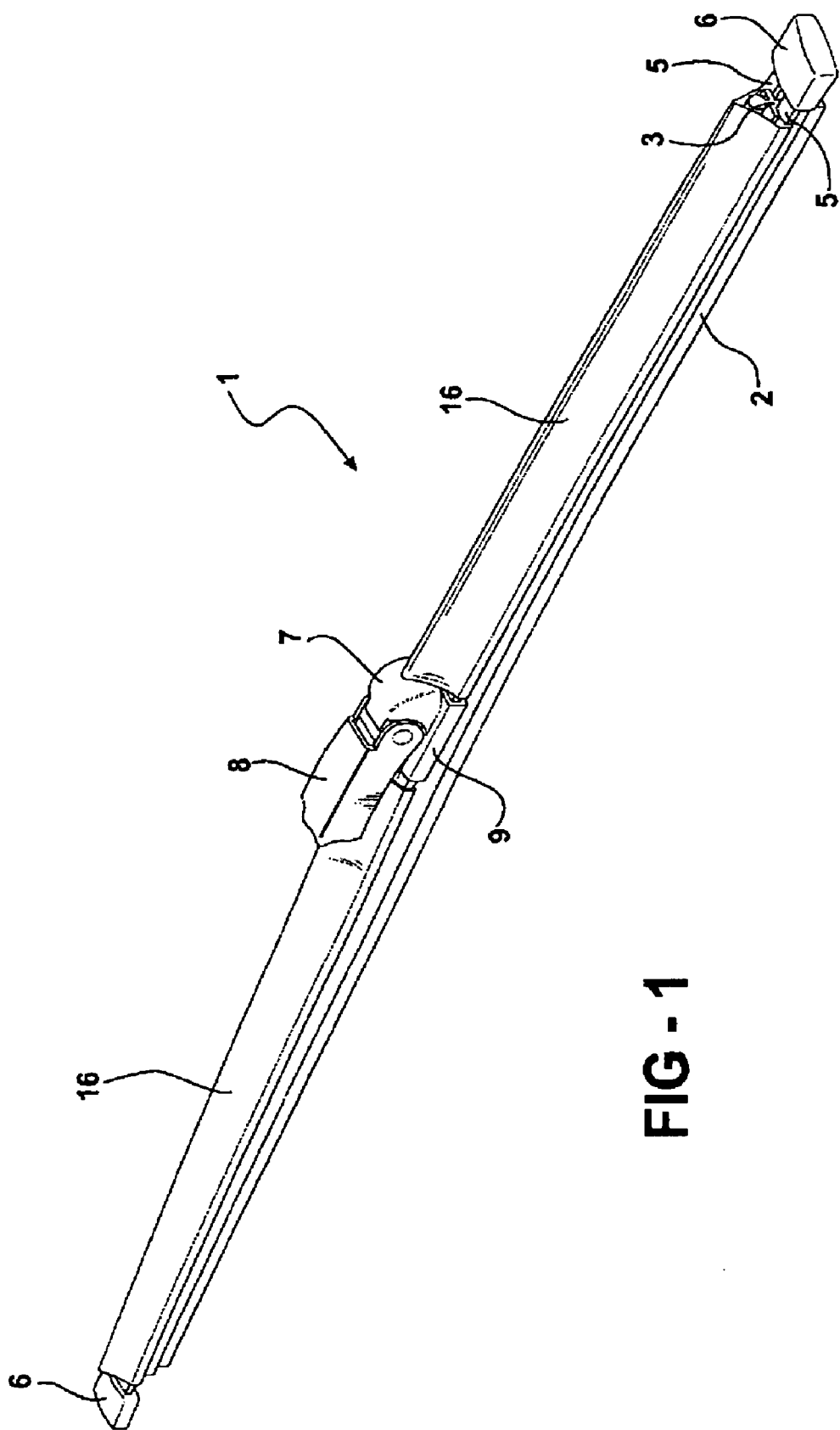
FIG. 1 is a perspective, schematic view of a preferred embodiment of a windscreen wiper device according to the invention.
Figure 3:
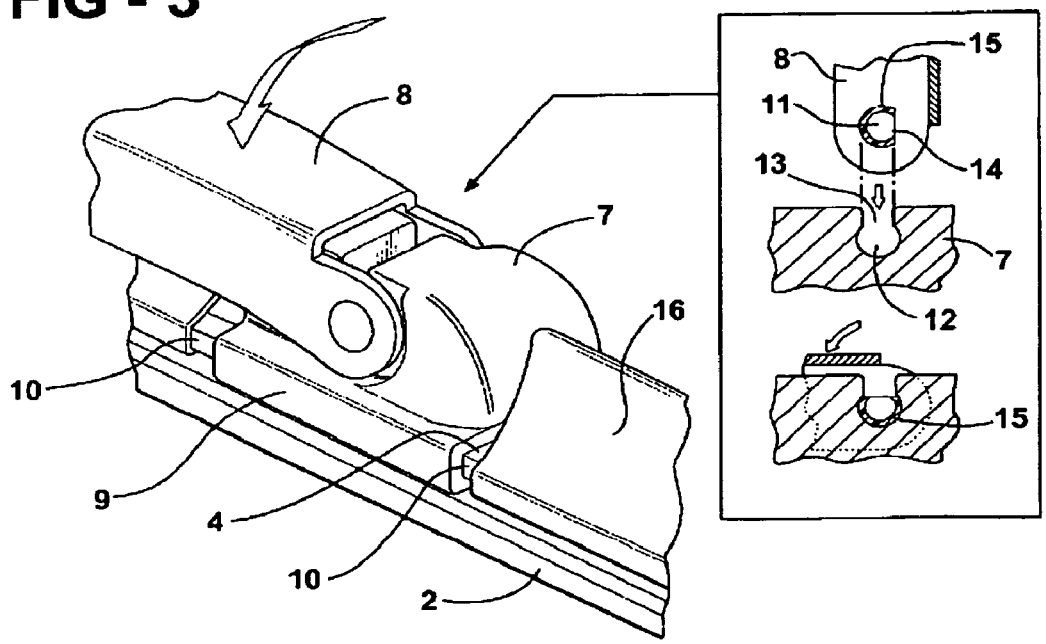

FIGS. 1, 2 and 3 show a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biassed in a curved position (the curvature in operative position being that of a windscreen to be wiped). Neighbouring ends 5 of strips a are interconnected on either side of the windscreen wiper device 1 by means of connecting pieces 6 functioning as clamping members. In this embodiment, the connecting pieces 6 are separate constructional elements, which may be form-locked ("positive locking" or "having positive fit") as well as force-locked to the ends 5 of strips 4. In another preferred variant, said connecting pieces 6 are in one piece with the strips 4 made of spring band steel. In the latter case said connecting pieces form transverse bridges for the strips 4, as it were.

The windscreen wiper device 1 is furthermore built up of a connecting device 7 of plastic material for an oscillating wiper arm B. Connecting device 7 comprises clamping members 9 that are integral therewith, which engage round longitudinal sides 10 or the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis rear one end, and that in the following manner. The end of oscillating wiper arm 8 has an at least substantially U-shaped cross-section at the location of its connection to the connecting device 7. On both sides of the legs of the U-shaped cross-section the end of oscillating wiper arm 8 includes two at least substantially cylindrical, inwardly extending protrusions 11, which form cylindrical bearing surfaces, at the location of the pivot axis. Said protrusions 11 can be readily inserted into a correspondingly shaped recess 12 in the connecting device 7 from a vertical position of the oscillating wiper arm 8. This can take place freely from said vertical position, because the width of said protrusions 11 is smaller than that of the insertion opening 13 of the recess 12 in that position: it so happens that both protrusions 11 have a flat guide surface 14 (FIG. 2). Then the oscillating wiper arm a is pivoted through 90 degrees about the pivot axis, from its vertical position to a horizontal position (FIG. 3). In the horizontal position of the oscillating wiper arm 8, the width of said protrusions 11 is larger than the width or the insertion opening 13 of the recess 12, so that the oscillating wiper arm 5 is locked with respect to the connecting device 7 in that position (FIG. 3). The connecting device 7 may include a longitudinal guide groove, in which the end of the oscillating wiper arm 8 rests in its horizontal position. In another preferred variant, the protrusions 11 can be snapped, that is, clipped into said recess 12. Possibly, a spoiler 16 is furthermore provided. Instead of one recess 12 as shown, also two recesses (one for each protrusion 11) may be used.

In order to prevent the occurrence of wear on protrusions 11, said protrusions are preferably each fitted with a joint part or spacer 15 of a wear-resistant plastic material, which surrounds said protrusions, so that the pivoting movement of connecting device 7 and oscillating wiper arm 8 with respect to each other takes place substantially without friction. Such a joint part 15 is not necessarily mounted entirely around said protrusions: only these parts or said protrusions that during use make mechanical contact with (parts of) the connecting device 7 are surrounded by a joint part 15. When using joint parts 15 said protrusions 11 may have an entirely round form. (i.e. without a guide surface), seen in cross-section.

FIG. 4 corresponds with FIG. 2, wherein parts corresponding with parts of FIG. 2 are designated with the same reference numerals. Instead of two protrusions 11 extending between both legs of the U-shaped cross-section 1, now use is made of a pin 17 extending from one leg to the other leg of the U-shaped cross-section. The way of connecting the oscillating arm 8 to the connecting device 7 is identical to the way described in relation to FIGS. 2 and 3.

In assembled position the connection of the oscillating arm 6 and the connecting device 7 may be covered by a cover in order to prevent rain, dust, etcetera entering the connection. The cover is preferably made as a single, plastic and detachable unit.

The invention is not restricted to the variants as shown in the drawing, but it also extends to other embodiments that fall within the scope of the appended claims.

The invention claimed is:

1. A method for manufacturing a windscreen wiper device, comprising forming opposing longitudinal grooves in the longitudinal sides of an elongated wiper blade of a flexible material, which can be placed in abutment with a windscreen to be wiped; fitting longitudinal strips of a carrier element in the grooves in spaced-apart relationship to one another; interconnecting neighboring ends of the longitudinal strips by a respective connecting piece; pivotally connecting an oscillating arm to a connecting device of the windscreen wiper device about a pivot axis near one end thereof, wherein the end of the oscillating wiper arm has an at least substantially U-shaped cross-section, and with the connecting device being at least partly positioned within the one end of the oscillating arm; providing the one end of the oscillating arm, at the location of the pivot axis, with at least one shaft extending between spaced legs of the U-shaped one end, with the shaft pivotally engaging the connecting device; pivotally mounting the shaft in at least one correspondingly shaped recess in the connecting device while interposing at least one joint part between said at least one shaft and said at least one correspondingly shaped recess; dimensioning the shaft such that it can be passed freely through an insertion opening of the recess from an at least substantially perpendicular position of the oscillating arm with respect to the wiper blade and be locked in position in the recess from at an least substantially parallel position of the oscillating wiper arm with respect to the wiper blade.

2. A windscreen wiper device comprising;
an elongated wiper blade of a flexible material which can be placed in abutment with a windscreen to be wiped having opposing longitudinal grooves on opposite longitudinal sides thereof;
an elongated carrier element comprising spaced-apart, longitudinal, elastic strips disposed in said grooves;
connecting pieces interconnecting neighboring ends of said strips;
a connecting device located along said carrier element and having at least one substantially cylindrical recess, said at least one recess also having an insertion opening, which is adapted for pivotal and locking engagement with a wiper arm having a pivot axis near one end which has a substantially U-shaped cross-section comprising two spaced legs, each leg having a substantially cylindrical protrusion extending inwardly at the pivot axis which pivotally engages and secures said one end of the wiper arm to the connecting device; and
two joint parts which are adapted to be housed within said at least one recess wherein each said joint parts is located between said at least one recess and a respective ones of the protrusions, and wherein said protrusions are dimensioned to freely pass through said insertion opening from an at least substantially perpendicular position of said oscillating arm with respect to said wiper blade, and wherein said protrusion are adapted to be locked in position in said recess from an at least substantially parallel position of the oscillating wiper arm with respect to the wiper blade.

3. A windscreen wiper device according to claim 2 wherein said connecting device includes a guide groove for said oscillating wiper arm.

4. A windscreen wiper device according to claim 2 wherein said connecting pieces comprise clamping members formed as separate constructional elements.

5. A windscreen wiper device according to claim 4 wherein said connecting pieces are form-locked or force-locked to the adjacent ends of said longitudinal strips.

6. A windscreen wiper device according to claim 2 wherein said connecting pieces are formed as one piece with said longitudinal strips.

7. A windscreen wiper device according to claim 2 wherein said longitudinal strips are made of spring band material.

8. A windscreen wiper device according to claim 2 wherein said connecting device comprises clamping members which engage around longitudinal sides of said longitudinal strips that face away from each other.

9. A windscreen wiper device according to claim 8, wherein said connecting device and said clamping members are made in one piece.

10. A windscreen wiper device according to claim 2, wherein said joint parts each comprise a wear-resistant plastic material.

11. A windscreen wiper device comprising:
an elongated wiper blade of a flexible material which can be placed in abutment with a windscreen to be wiped having opposing longitudinal grooves on opposite longitudinal sides thereof;
an elongated carrier element comprising spaced-apart, longitudinal, elastic strips disposed in said grooves;
connecting pieces interconnecting neighboring ends of said strips;
a connecting device located along said carrier element and having at least one substantially cylindrical recess, each recess having an insertion opening, which is adapted for pivotal and locking engagement with a wiper arm having a pivot axis near one end which has a substantially U-shaped cross-section comprising two spaced legs and which has a substantially cylindrical pin extending from one leg to the other leg at the location of the pivot axis which pivotally engages and secures said one end of the wiper arm to the connecting device; and
at least one joint part is located between said recess and the pin,
wherein said pin is dimensioned to freely pass through insertion opening from an at least substantially perpendicular position of said oscillating arm with respect to said wiper blade, and wherein said pin is adapted to be locked in position in said recess from an at least substantially parallel position of the oscillating wiper arm with respect to the wiper blade.

12. A windscreen wiper device according to claim 11, wherein said joint part comprises a wear-resistant plastic material.

13. A windscreen wiper device according to claim 11 wherein said connecting device includes a guide groove for said oscillating wiper arm.

14. A windscreen wiper device according to claim 11 wherein said connecting pieces comprise clamping members formed as separate constructional elements.

15. A windscreen wiper device according to claim 14 wherein said connecting pieces are form-locked or force-locked to the adjacent ends of said longitudinal strips.

16. A windscreen wiper device according to claim 11 wherein said connecting pieces are formed as one piece with said longitudinal strips.

17. A windscreen wiper device according to claim 11 wherein said longitudinal strips are made of spring band material.

18. A windscreen wiper device according to claim 11 wherein said connecting device comprises clamping members which engage around longitudinal sides of said longitudinal strips that face away from each other.

19. A windscreen wiper device according to claim 18, wherein said connecting device and said clamping members are made in one piece.

* * * * *

UNITED STATES PATENT AND TRADEMARK OFFICE
CERTIFICATE OF CORRECTION

PATENT NO. : 7,055,206 B2  Page 1 of 1
APPLICATION NO. : 10/495497
DATED : June 6, 2006
INVENTOR(S) : Xavier Boland It is certified that error appears in the above-identified patent and that said Letters Patent is hereby corrected as shown below:

Column 5, line 1    replace ";" with - - : - -

Column 5, line 21   replace "parts" with - - part - -

Column 5, line 23   replace "ones" with - - one - -

Column 5, line 27   replace "protrusion" with - - protrusions - -

Column 6, line 21   After joint part delete "is"

Column 6, line 24   After "through" insert - - said - -

Signed and Sealed this

Fifth Day of September, 2006

JON W. DUDAS
*Director of the United States Patent and Trademark Office*